United States Patent [19]

Downey

[11] 3,844,374

[45] Oct. 29, 1974

[54] CONTROL ROD ORIFICE SEAL ASSEMBLY

[75] Inventor: Wayne Allman Downey, Dubuque, Iowa

[73] Assignee: Deere & Company, Moline, Ill.

[22] Filed: May 29, 1973

[21] Appl. No.: 364,733

[52] U.S. Cl............... 180/90.6, 74/18.1, 74/18.2, 277/100, 277/175
[51] Int. Cl............................................ B62d 25/20
[58] Field of Search.......... 180/90.6; 296/1 F, 28 C, 296/28 G; 74/18, 18.1, 18.2, 563, 564, 566; 277/100, 173, 174, 175

[56] References Cited
UNITED STATES PATENTS

| 157,666 | 12/1874 | Wright et al.................. 277/100 X |
| 1,983,368 | 12/1934 | Hathorn............................. 277/100 |
| 2,765,184 | 10/1956 | Mackie........................ 180/90.6 X |
| 3,748,923 | 7/1973 | Babbitt et al......................... 74/566 |

Primary Examiner—Lloyd L. King
Assistant Examiner—Randolph A. Reese

[57] ABSTRACT

A vehicle includes controls located within a cab and including a plurality of control rods projecting through respective orifices located in the floor of the cab. The orifices are dimensioned so as to accommodate sideways as well as axial movement of the control rods therein. Associated with each orifice is a seal assembly designed for preventing the passage of noise and cab pressure through the orifice around the associated control rod. Each seal assembly comprises a relatively thick washer-like member which is loosely received on a respective control rod and contacts the floor to cover the periphery of the associated orifice and has an upper spherically contoured seat in which a complementary portion of a seal member is received, the seal member being slidingly and sealingly mounted on the control rod. The contact between the washer-like member and the floor, and between the floor and seal member being maintained through means of a compression spring compressed between a retaining bracket and the seal member.

6 Claims, 2 Drawing Figures

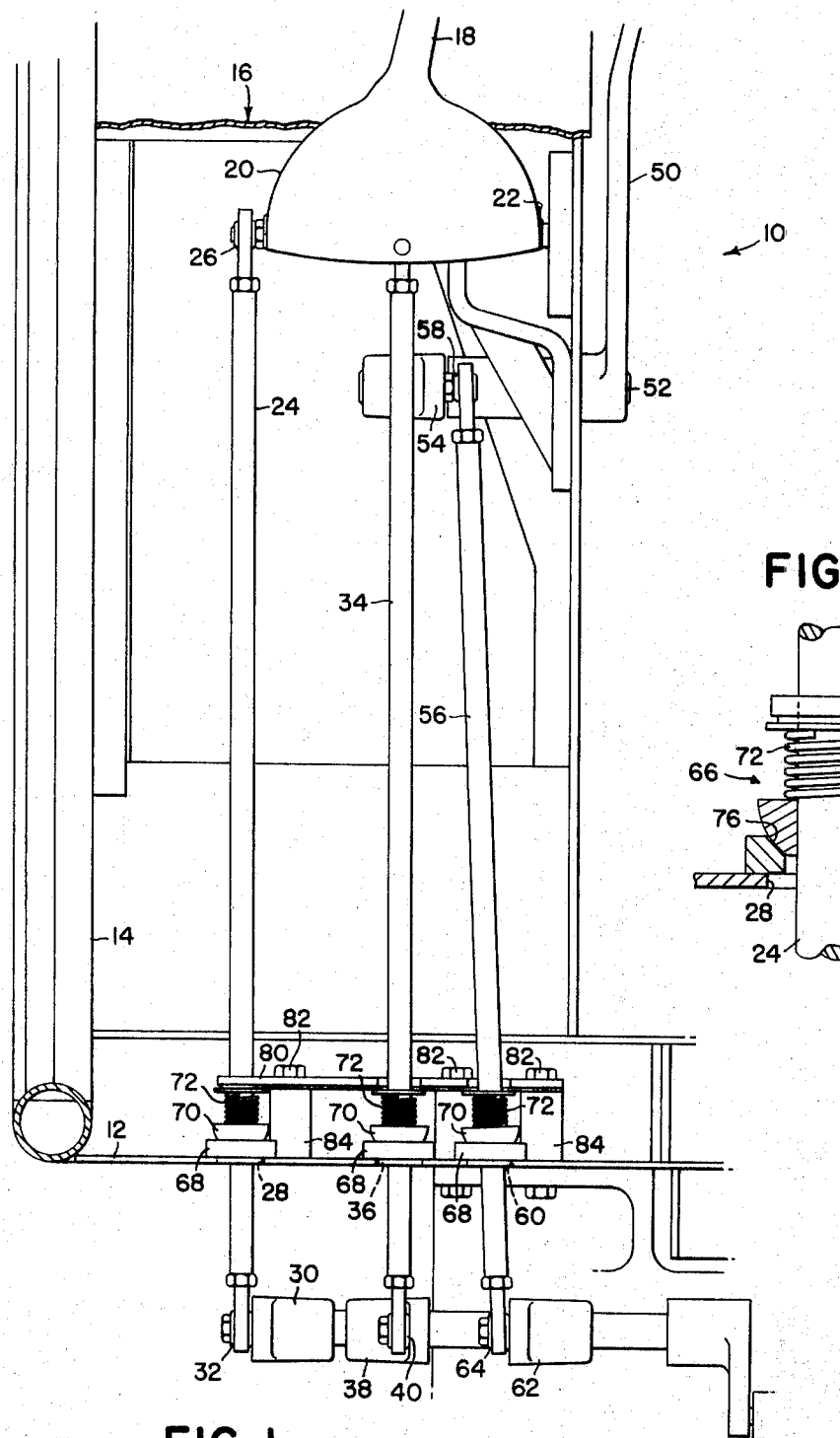
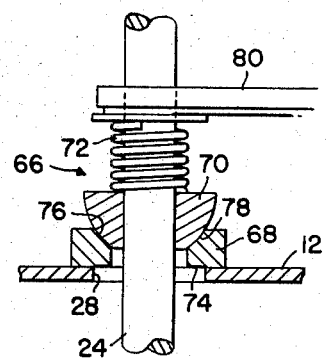
FIG. 2
FIG. 1

CONTROL ROD ORIFICE SEAL ASSEMBLY

BACKGROUND OF THE INVENTION

The present invention relates to a vehicle cab and more particularly relates to a seal assembly for sealing an orifice through which projects a control rod of a control located within the cab.

It is now common practice to equip vehicles with cabs having air conditioners, pressurizers, heaters and the like in order that the vehicle operator may work in a comfortable environment free from dust and noise and being of a suitable temperature. Since many of the elements which the operator must control are located exteriorly of the cab, various control rods or linkages must extend through the orifices located in the cab walls. These orifices are often substantially larger than the cross section of the rod extending therethrough in order to accommodate the necessary movement to which the rod must move to effect its controlling function. Consequently, in some cases a considerable clearance exists between the control rod and the orifice through which it extends, thus defining a passage through which noise may pass from the outside of the cab to the inside and through which pressure in the cab may be lost resulting in the cab pressure being too low to prevent dust from entering the cab through these passages and any of the various small "leaks" which are normally present in a cab.

SUMMARY OF THE INVENTION

According to the present invention, there is provided a novel seal assembly for sealing the clearance between an orifice in a cab wall and a control rod extending through the orifice, the seal assembly being designed to exclude noise and retain cab pressure.

It is an object of the invention to provide a seal assembly, as aforedescribed, which is of a compact, rugged, inexpensive construction. A further object of the invention is to provide a seal assembly which effectively performs its sealing function without inhibiting the free movement of the control rod extending through the orifice being sealed.

These and other objects will become apparent from the ensuing description and the appended drawing.

BRIEF DESCRIPTION OF THE DRAWING

FIG. 1 is a vertical sectional view showing a portion of a vehicle cab embodying the seal assemblies constructed according to the present invention.

FIG. 2 is an enlarged vertical sectional view showing one of the seal assemblies illustrated in FIG. 1.

DESCRIPTION OF THE PREFERRED EMBODIMENT

Referring now to the drawing, a portion of a vehicle cab is indicated in its entirety by the reference numeral 10. For the sake of brevity, only a bottom wall or floor 12 and a side wall 14 of the cab 10 are illustrated and it is to be understood that the cab 10 is conventionally constructed of other walls, windows and at least one door which cooperate to provide a completely enclosed working area for the operator of the vehicle on which the cab is mounted. Further, it is to be understood that the cab 10 may be provided with any conventional system or systems for effecting any of the functions of air conditioning, heating or pressurizing the cab.

Mounted within the cab 10 is a control console 16 whereat manually operable controls are located for controlling functions located exteriorly of the cab. The controls illustrated are typical of the type used for controlling hydraulic motors for selectively positioning lift arms and buckets of industrial loaders and for controlling hydraulic actuators for positioning equipment such as a ripper or the like. Specifically, the controls illustrated here include a first hand lever 18 having a scullcap-like bottom portion 20 universally connected, as at 22, to a support wall of the control console 16. A first control link or rod 24 has its upper end connected to the bottom portion of the hand lever 18 by means of a ball joint 26 which is positioned transversely opposite to the universal connection 22. The control link 24 projects downwardly from the hand lever 18 and extends through an orifice 28 in the floor 12 of the cab and has a lower end connected to a link member 30 by means defining a ball joint 32, the link member 30 in turn being connected to a direction control valve (not shown) in a conventional manner for operating the valve in response to selected movement of the hand lever 18. A second control link or rod 34 has its upper end universally connected to the scull-cap-like bottom portion 20 of the hand lever 18 through means of a ball joint (not shown) which is located at one side of the lever portion 20 substantially midway between the universal connection 22 and the ball joint 26. Like the control link 24, the control link 34 extends downwardly from the handle and projects through an orifice 36 in the floor 12 of the cab and has a bottom end connected to a link member 38 by means of a ball joint 40, the link member being connected to a second valve member (not shown) in such a way as to actuate the valve when the hand lever 18 is moved in a selected direction. A second hand lever 50 is pivotally connected, as at a connection 52, to the support wall of the control console 16 for fore-and-aft swinging movement and includes a crank arm 54 which is pivotally connected to the upper end of a third control link or rod 56, as at a ball joint 58. The control link extends downwardly from the crank arm 54 and projects through an orifice 60 located in the cab floor 12. The lower end of the control link 56 is connected to a link member 62, as at a ball joint 64, the link member in turn being operatively connected to a control valve (not shown) which is actuated in response to selected movement of the hand lever 50.

As is evident from the drawing, the orifices 28, 36 and 60 are substantially larger than the transverse dimensions of the control links 24, 34 and 56, respectively. The clearances thus existing between the periphery of the orifices and the respective rods positioned therein are necessary so as to permit the rods to move both axially of and sideways in the orifices as is necessary for their proper operation.

Associated with each of the control links for blocking the clearance spaces existing between the links and the orifices are respective seal assemblies 66. The seal assemblies 66 each include three main elements arranged axially on the associated control link, namely, an apertured, relatively thick washer-like member 68, an apertured, substantially hemispherical seal member 70 and a compression coil spring 72. The washer-like member 68 has a flat, annular underside or surface 74 which is in constant sealing engagement with an area of the floor 12 containing the entire periphery of the associated orifice. The aperture of the washer-like member 68 is dimensioned so as to loosely receive the associated control link and the upper end of the aperture is contiguous with an annular upwardly facing spherically contoured surface 76 formed in the upper side of the member 68. The seal member 70 has a spherical surface 78 which is shaped complementary to the spherical surface 76 of the washer-like member 68, the surfaces 76 and 78 being held in bearing relationship with each other by means of the compression spring 72 which is compressed between the upper surface of the sealing member 70 and a washer held in place by the lower side of a plate 80 fixed in parallel spaced relationship to the floor 12 through means of a plurality of bolts 82 and spacers 84 positioned on the bolts, the plate 80 being appropriately notched so as to provide clearance for the control links 24, 34 and 56. The aperture in the seal member 70 is dimensioned so as to be in sliding sealing engagement with the associated control rod.

Thus, it will be appreciated that in operation the seal member 70 will be carried by the associated control link or rod when the latter is moved sideways relative to the associated orifice in the floor 12. Further, it will be appreciated that the spherically contoured surfaces 76 and 78 respectively of the washer-like member and the seal member cooperate to form a ball-and-socket-like connection between the members 68 and 70 by which the seal member may rock relative to the washer-like member and that the spring 72 acts to maintain the spherically contoured surfaces 76 and 78 in sealing and bearing engagement with each other and to maintain the underside 74 of the washer-like member 68 in sealing engagement with the floor 12.

I claim:

1. In combination with a vehicle cab including a wall having at least one aperture therein and a control means mounted in the cab and including a control element extending through and being loosely received in said aperture and thus defining a clearance space between the periphery of the aperture and the control element, a seal assembly for tightly closing said clearance space, comprising: an apertured relatively thick washer-like member being loosely received on said control element and having a first side in sliding engagement with said wall and having a second side facing away from said wall; said washer-like member being dimensioned so that said first side always overlaps the entire periphery of said aperture; a seal member having a bore extending therethrough and having a spherically contoured surface portion surrounding one end of said bore; said seal member being mounted with said control element received in said bore and with said surface portion facing said washer-like member, said bore having a dimension disposing it in sliding and sealing engagement with said control element; said washer-like member having a surface portion surrounding the aperture thereof and being configured complementary to and receiving said spherically contoured surface portion of said seal member; and resilient biasing means urging said seal member against said washer-like member and said washer-like member against said wall.

2. The combination recited in claim 1 and further including a plate having an opening therein receiving said control rod; and said plate being fixed to said cab in substantial parallel spaced relationship to said wall; and said resilient biasing means including a helically coiled compression spring compressed between said plate and said seal member.

3. In combination with a vehicle cab including a wall having at least one aperture therein and control means mounted in the cab and including a control rod extending through and being loosely received in said aperture, a seal assembly for sealing the aperture area located between the aperture periphery and the rod, comprising: a first member being mounted in sliding engagement with said wall and including an aperture loosely receiving said control rod and dimensioned so as to be constantly entirely in register with said aperture in said wall; a seal member having a substantially spherically contoured surface; a bore extending through said seal member in crosswise relationship to said spherically contoured surface and said control rod being slidably and sealingly received in said bore so as to dispose said spherically contoured surface toward said first member; and said first member including a bearing surface shaped complementary to and receiving said spherically contoured surface; and resilient biasing means urging said seal member against said first member and said first member against said wall.

4. The combination recited in claim 3 and further including a plate having an opening therein receiving said control rod; and said plate being fixed to said cab in substantial parallel spaced relationship to said wall; and said resilient biasing means including a helically coiled compression spring compressed between said plate and said seal member.

5. Closure joint means for a plurality of holes in a wall and between the wall and a plurality of rods respectively extending through the holes, the rods being shiftable in the holes both in the plane of the wall and toward and away from said wall, said closure joint means comprising: each hole having associated therewith a first member having a surface lying adjacent to and in sliding contact with the wall and for closing the hole except for a central opening through which a respective one of the rods loosely extends, said member having a second surface spaced from the wall with a spherical surface section therein formed about and extending from the opening; a second member formed about said respective rod and having a central opening with the surface thereof in sliding contact with said respective rod and an outer spherical surface complementary with and engaging the spherical surface of the first member to thereby define a ball and socket joint between the first and second members; a plate-like member fixed to the cab in spaced parallel relationship to the wall at a location directly above said plurality of holes; said plate-like member having a plurality of openings therein respectively receiving said plurality of rods; and a coil compression spring member received on each rod and compressed between said plate-like member and a respective one of said second members to hold the respective second member in contact with a respective one of the first members and to hold the respective second member in contact with the wall.

6. In combination with a vehicle cab including a wall having at least one orifice therein and a control means mounted in the cab and including a control element extending through and being loosely received in said orifice, a seal assembly comprising: first and second ring-like members having respective holes extending therethrough and being mounted with said control element passing through said holes; said first member including a first surface in constant sliding engagement with an area of said wall completely surrounding and including the periphery of said orifice and the hole of the first member being dimensioned so as to loosely receive said control element; the hole of said second member being dimensioned to slidingly and sealingly embrace said control element; said first and second members having opposed surface means in engagement with each other and configured so as to form a universal bearing connection between said first and second members; and resilient biasing means urging said second member into engagement with said first member and said first member into engagement with said wall.

* * * * *